Figure 1:
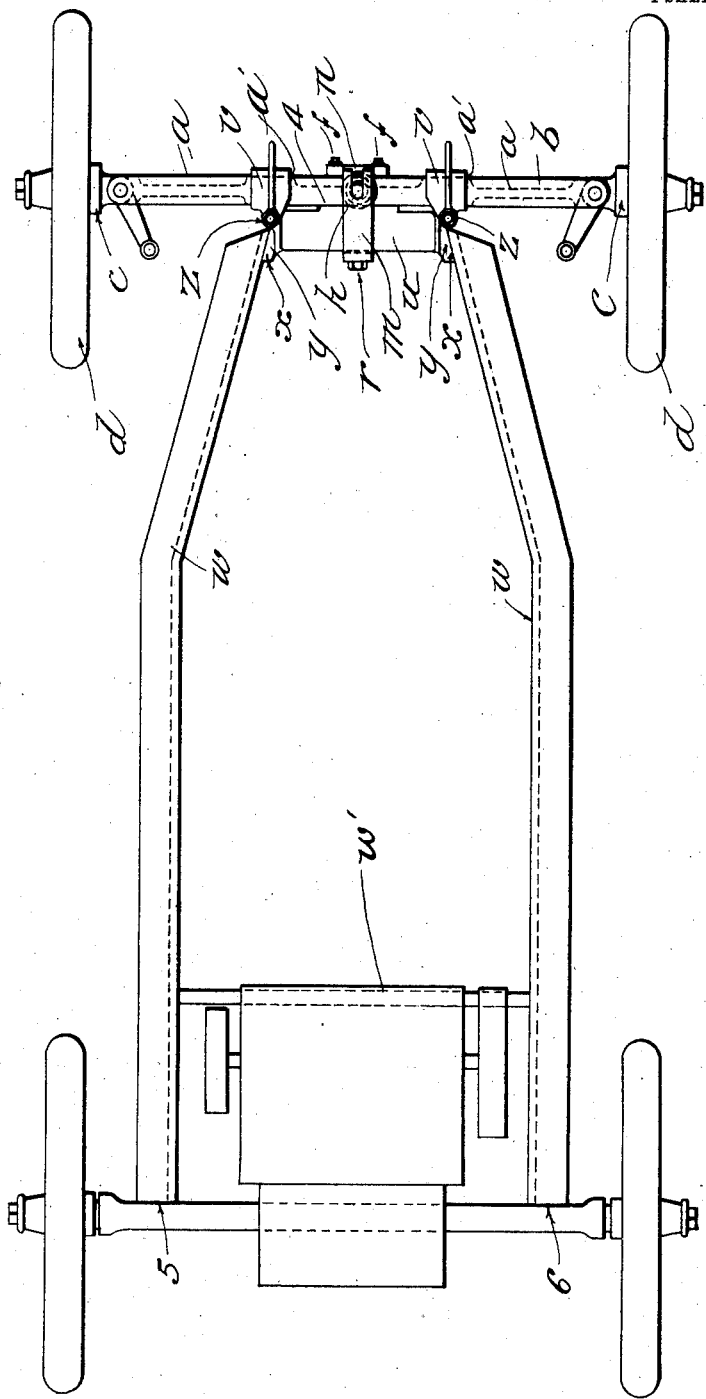

No. 883,113. PATENTED MAR. 24, 1908.
H. A. KNOX.
SUSPENSION DEVICE FOR MOTOR FRAMES.
APPLICATION FILED OCT. 17, 1906.

4 SHEETS—SHEET 1.

Witnesses:
H. L. Sprague
H. W. Bowen

Inventor:
Harry A. Knox
by Chapin &Co.
Attorneys.

THE NORRIS PETERS CO., WASHINGTON, D. C.

No. 883,113. PATENTED MAR. 24, 1908.
H. A. KNOX.
SUSPENSION DEVICE FOR MOTOR FRAMES.
APPLICATION FILED OCT. 17, 1906.
4 SHEETS—SHEET 2.
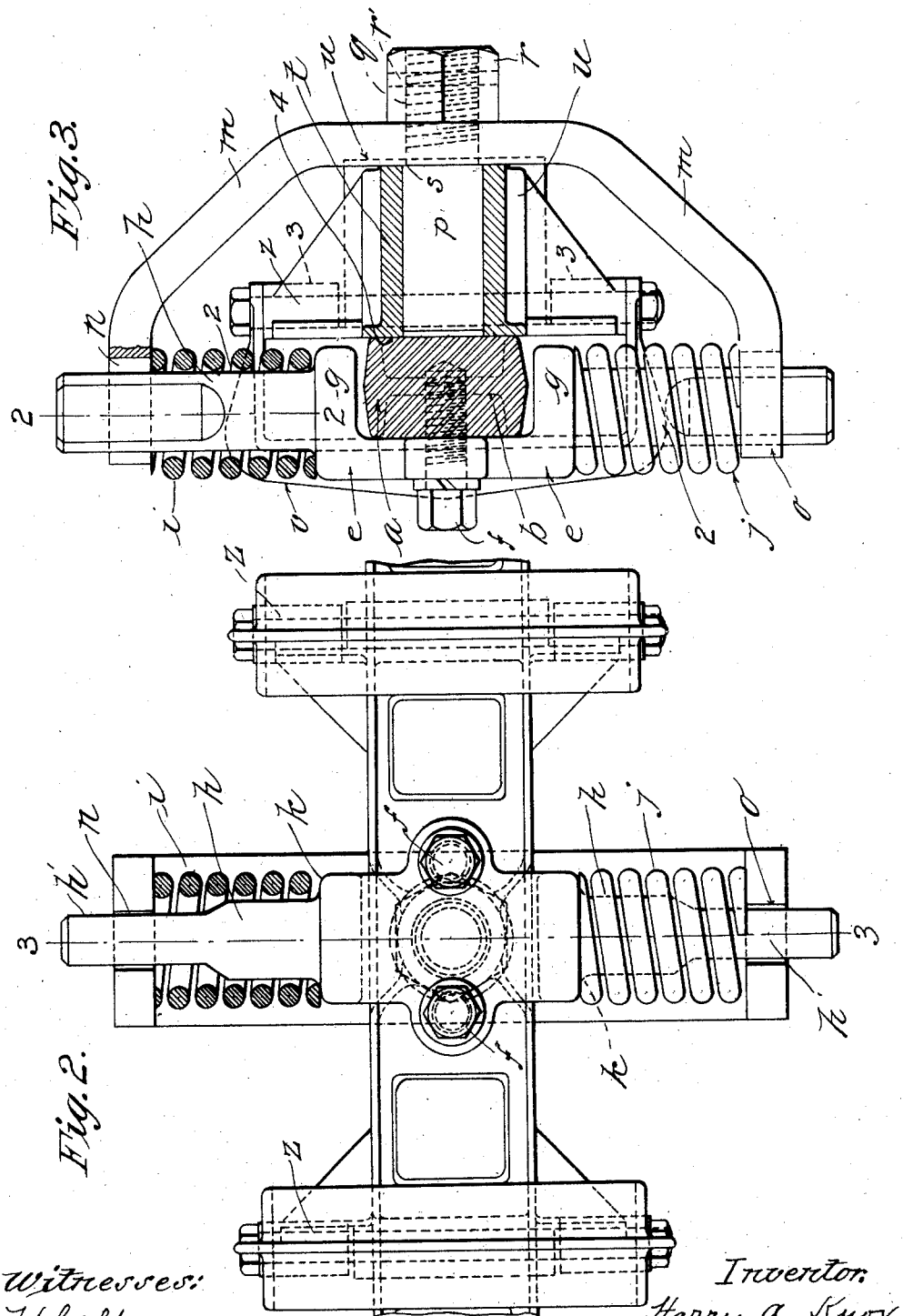
Witnesses:
H. L. Sprague.
H. W. Bowen.
Inventor:
Harry A. Knox
by Chapin & Co.
Attorneys.

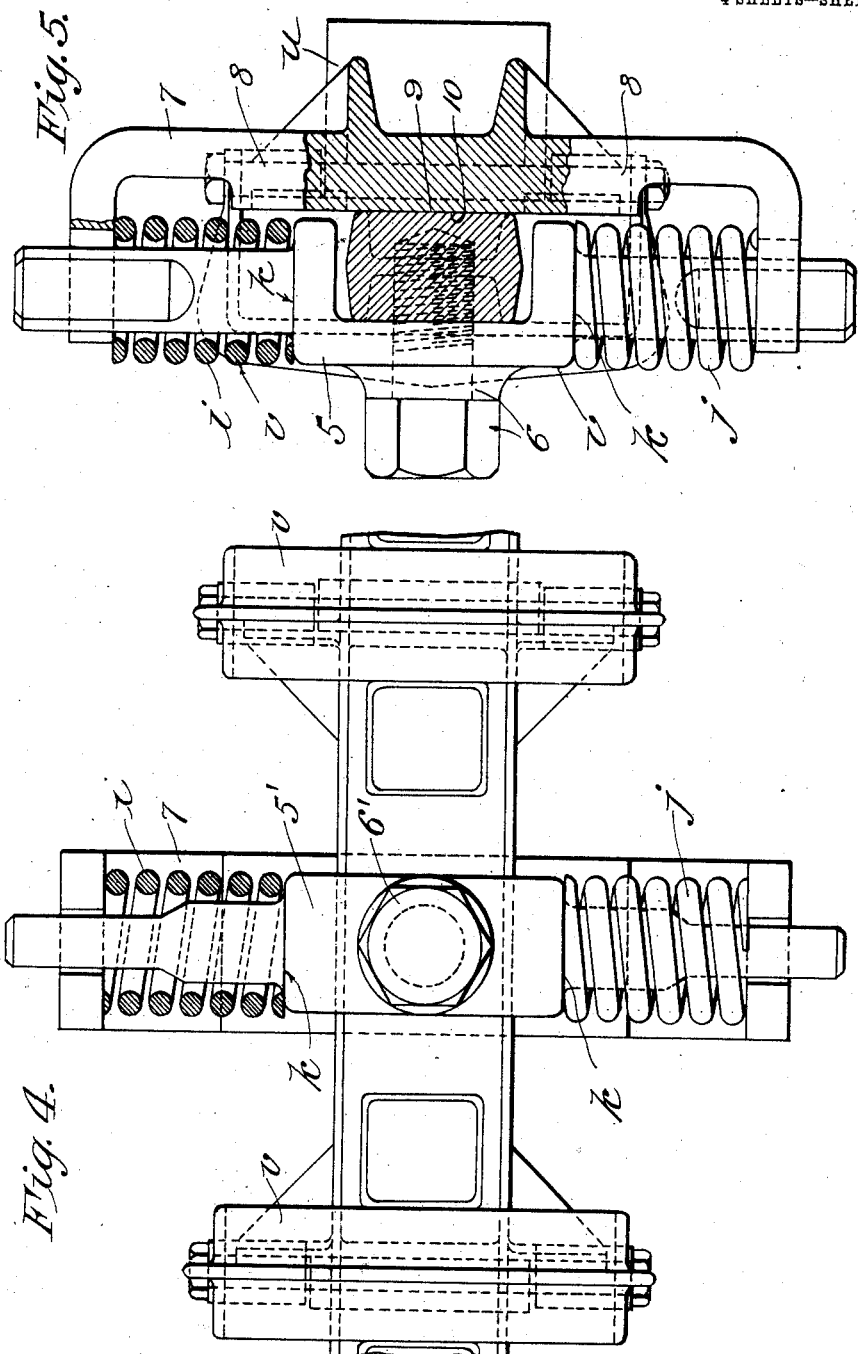

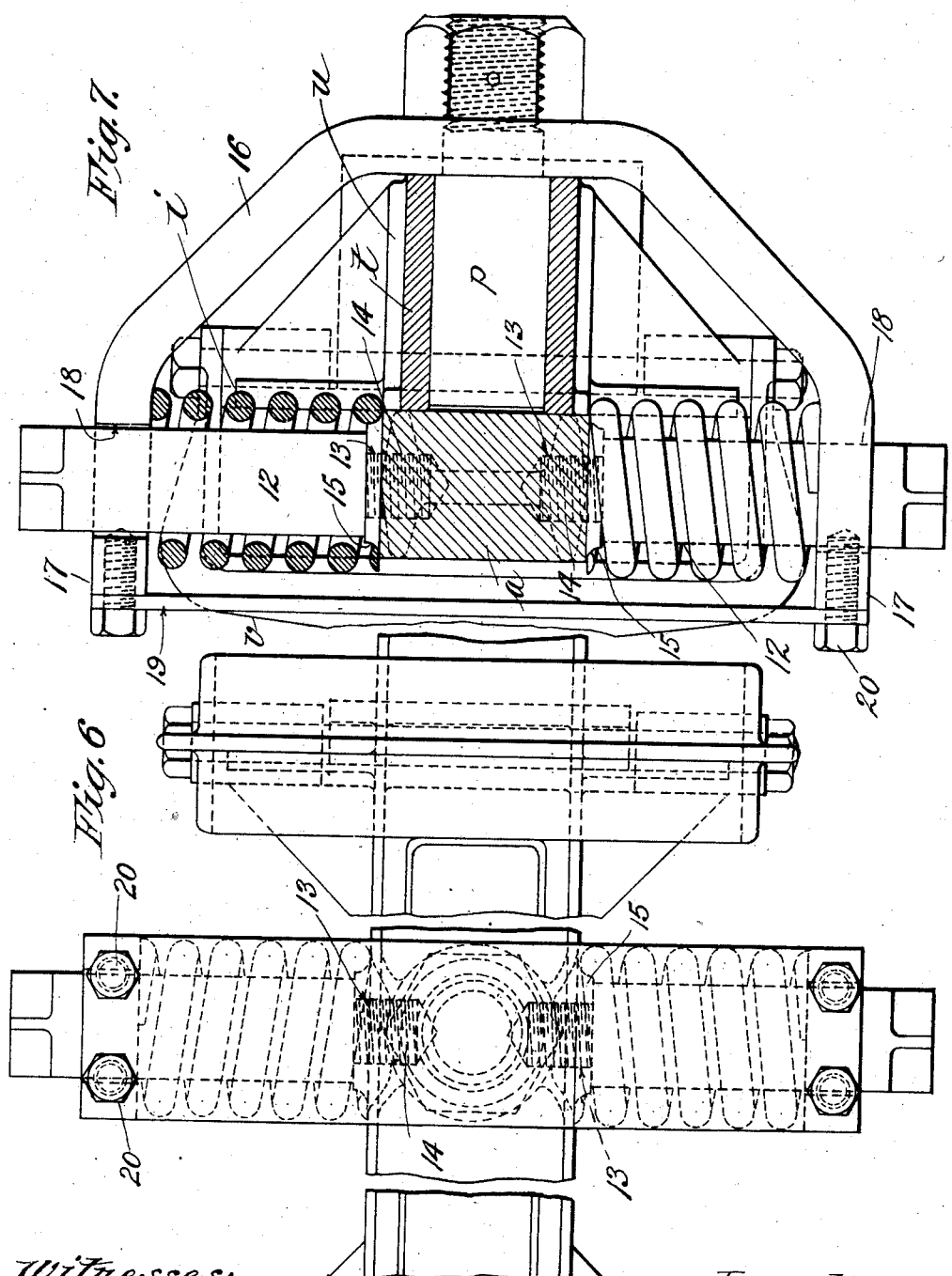

UNITED STATES PATENT OFFICE.

HARRY A. KNOX, OF SPRINGFIELD, MASSACHUSETTS.

SUSPENSION DEVICE FOR MOTOR-FRAMES.

No. 883,113.     Specification of Letters Patent.     Patented March 24, 1908.

Application filed October 17, 1906. Serial No. 339,347.

*To all whom it may concern:*

Be it known that I, HARRY AUSTIN KNOX, a citizen of the United States of America, residing at Springfield, in the county of Hampden and State of Massachusetts, have invented new and useful Improvements in Suspension Devices for Motor-Frames, of which the following is a specification.

This invention relates to improvements in motor frames for motor cars as used on automobiles, and especially of the type of frames known as the three-point suspension which are employed on heavy drays.

One of the objects of my invention is to provide a structure that will permit the forward axle to oscillate freely in a vertical plane about a stud carried by the forward portion of the reaches and at the same time relieve the stud from all twisting or torsional strain that may be placed upon the reaches of the supporting framework.

Briefly stated, one form of my invention consists in rigidly bolting to the forward axle a spring-post provided with oppositely extending reduced ends and projecting above and below the axle, and in securing to this axle a piece which I term the "front frame end" for connecting together the forward end of the reaches of the motor frame and also in connecting the same to the forward axle. A spring-yoke is secured to the front frame end to receive the oppositely extending reduced ends of the spring-post on which are placed compression springs the same being located between the ends of the spring-yoke and shoulders on the spring-post whereby the forward axle can freely oscillate on the stud according to the unevenness of the road, and at the same time relieve the stud of all torsional strain on the motor frame proper that may exist in practice between the forward end of the reaches and the front axle. Other forms of my invention will be referred to later in the body of the specification.

A further object is to provide a motor suspension frame that will permit the forward end of the same to have a free vertical movement while the rear end of the same remains fixed.

In the drawings which illustrate my invention,—Figure 1 is a plan view of my improved three-point suspension motor-frame showing in outline the driving motor. Fig. 2 is a front elevation of the forward axle showing the manner of securing the spring-post to the same and the manner of securing the forward end of the reaches to the axle. Fig. 3 is an end view of Fig. 2 showing in side elevation the spring-yoke, the stud carried thereby, and about which the front end of the motor frame can oscillate, and in dotted lines the axle-yokes embracing said axle which permits the same to have free vertical oscillatory movement, and at the same time relieves the stud of all torsional strain. Fig. 4 is a modification of the spring-post showing the same pivotally secured to the front axle and also showing the spring-yoke and compression springs in place in the same manner as the view shown in Fig. 2. Fig. 5 is an end view of the modification shown in Fig. 4 and showing in side elevation the spring-yoke and the compression springs located between the ends of the yoke and the shoulders of the spring-post. Fig. 6 is a front elevation of another form of my invention in which the spring-post instead of being made in one piece, as shown in the other views, consists of two studs each provided with a shoulder to receive the inner end of the compression spring and screwed into the upper and lower side of the forward axle, the ordinary compression springs being located between the shoulders of the studs and the inner ends of the spring-yokes, as before. Fig. 7 is an end elevation of the view shown in Fig. 6 in which the spring-yoke is shown in side elevation in the same manner as in Fig. 3.

Referring to these drawings in detail, $a$ designates the forward axle, preferably made in the form of an I-beam, as indicated by the dotted lines $b$ in Figs. 1 and 3. To the outer ends of the axle are pivoted the usual studs $c$ for supporting the forward wheels, as indicated at $d$.

$e$ designates what I term a spring-post that is rigidly secured to the axle $a$ by means of the bolts $f$. This post is provided with projecting portions $g$ that extend over and also beneath the axle $a$, as shown in Fig. 3. Integral with the portions $g$ are right angular extensions $h$, circular in shape, for receiving the compression springs $i$ and $j$ that are located respectively above and below the projecting portions $g$ and forming shoulders $k$ for the inner ends of the springs to rest against.

The outer extremities of the extensions $h$ pass through rectangular openings in the ends of the spring-yokes $m$, as indicated at the points $n$ and $o$. The extensions $h$ are flattened at $h^1$ to correspond in shape with the openings $n$ and $o$. The yokes $m$ carry a stud $p$ that is secured to the same by means of the nut $r$ and locked in place by means of the pin $r^1$ shown in dotted lines in Fig. 3.

$s$ designates a shoulder between the threaded and unthreaded portions of the stud that bears firmly against the inner side of the spring-yoke $m$ when the nut $r$ is turned up and locked by the pin $r^1$.

$t$ designates a hub or boss on the front frame end-piece $u$ for receiving the stud $p$. The front end-piece $u$ is secured to the axle $a$ by means of the yokes $v$ which embrace the axle $a$ and to which the angle-iron reach members $w$ are rigidly secured at the point $x$ by bolting or otherwise, to the wing-members $y$ of the piece $u$.

$z$ designates bolts that are passed through the rearwardly extending upper and lower arms 2 of the yokes $v$ that embrace the front axle $a$ at the shouldered points $a^1$ and which secure the forward end of the reaches $w$, $w$, to the axle $a$. These bolts also are passed through bosses on the front frame-piece $u$, as indicated at 3, and with which the boss $t$ is made integral. The surfaces between the axle $a$ and the front frame-piece $u$ are planed off smoothly, as indicated by the numeral 4, and also the surfaces between the shoulders $a^1$ and the inner surface of the yokes $v$ to permit free movements between the same. It will be seen from this construction that the three points of suspension are at the points 5 and 6 on the rear axle, and the spring-post $e$ on the front axle, and in operation the forward end of the reaches can move freely up and down, the surfaces 4 permitting this movement.

The springs $i$ and $j$ absorb the vibrations due to the inequalities of the road, lessening the jar to the machinery that is carried by the reaches $w$, as indicated conventionally by the letter $w^1$. At the same time the yokes $v$ move freely up and down on their bearings against the axle $a$. Should one of the forward wheels drop into a depression or pass over an elevation in the road-way, the forward axle will simply rotate the stud $p$ in the boss or hub $t$, the motion being transmitted by the elements $b$, $e$, $h$ and $m$. By means of this construction, all torsional strain is taken off from the stud $p$ as the strains are borne by the yoke-pieces $v$ which embrace the axle $a$ and are located on opposite sides of the spring-post $e$, and closely embracing the axle $a$ so that no lost motion would occur between the axle and yoke, but freely permit the up and down movements of the axle and reaches $w$. It will be seen therefore that by means of this construction I have produced a simple and strong connecting means between the front axle and the forward end of the truck-frame, and one that will permit the two parts, as a whole, to move independently of each other and permit the forward end of the reaches $w$ which carry the driving machinery indicated by $w^1$ to move freely up and down about the rear axle as a center.

Referring to the modifications shown in Figs. 4 and 5, $5^1$ designates the spring-post that is secured to the forward axle $a$ by means of the pivotal bolt $6^1$. This post is in all respects like the one described above except that instead of being rigidly secured to the axle, it is pivotally secured. The usual compression springs $i$ and $j$ are located between the shoulders $k$ and the inner ends of the spring yoke-piece 7 which does not rotate about a fixed axis or stud, as described above, but is secured directly to the front frame piece $u$ that extends between the yokes $v$ so that the pivotal vibratory movement of the axle is about the bolt $6^1$ instead of about a stud that is secured to the spring-yoke, as shown in the other figures. In this construction, bolts 8 are used to connect the front frame-piece $u$ to the yoke-shaped pieces $v$ in the same manner as described above. In the operation of this form, the spring yoke-piece 7, to which the reaches are secured, can play freely in a vertical plane, as above described, the planed surface 9 of the axle sliding on the planed surface 10 of the spring-yoke 7, and the vertical oscillation of the axle is about the bolt $6^1$.

Referring to the modifications shown in Figs. 6 and 7, 12 designates studs that are secured to the upper and lower side of the axle $a$. These studs are provided with threaded ends 13 that are screwed into threaded openings 14 in the axle $a$. The upper and lower surfaces of the axle $a$ are provided with shoulders 15 for receiving the inner convolutions of the compression springs $i$ that are located between these shoulders 15 and the inner ends of the spring yoke-piece 16 which is similar to the spring-yoke $m$ described above in connection with Figs. 1, 2, and 3, with the exception that the ends 17, instead of being provided with rectangular-shaped openings, as shown in the above figures, are provided with circular openings 18. In order to strengthen the ends of the spring yoke-pieces 16 and hold the same rigidly in place, I use a strap 19, extending from the ends 17, that is securely fastened to these ends by means of the bolts 20. In this form, the usual yokes $v$ are used as in Figs. 1, 2, and 3, and the usual stud $p$ about which the axle $a$ vibrates when passing over the unevenness of the roadway. This stud is secured to the spring-yoke 16 in the same manner as shown in Figs. 2 and 3, and the front frame-plate $u$, (in which the boss $t$ is formed,) is secured in the same manner to the reaches of the motor frame. The operation of this form is identical with that described in connection with Figs. 1, 2, and 3.

It will be seen that the invention herein described permits the rear end of the suspension frame to remain practically stationary in passing over obstructions, while the forward end of the same can vibrate freely, the compression springs which are located between the axle and the spring-yoke absorbing the shocks and preventing any injury to the reaches and motor which is supported thereon. This construction also lessens the liability to breakage of the reaches of the suspension frame since when the frame is rigidly supported at its ends breakage of the reaches occurs at practically the middle point of its length.

The construction described herein successfully overcomes the breakage of the reaches as proved by actual practice since the load thereon, which is the motor indicated at $w^1$, is rigidly supported at only one end allowing the forward end of the reaches to vibrate freely about the rear axle as an axis.

The construction herein described maintains the two axles in planes that are parallel at all times to each other, and also removes all torsional strain from the horizontal stud.

What I claim, is:—

1. In a motor frame of the three-point suspension type, a forward axle, a spring-post secured thereto and having oppositely extending arms, a spring-yoke carried by said axle and connected to the reaches of the frame, and springs located between the outer ends of the yoke and the axle.

2. In a suspension device for the forward end of a three-point suspension motor-frame, a forward axle, a spring-post secured thereto and having oppositely extending arms, yokes embracing said axle and located at opposite sides of the spring-support for attaching the forward end of the reaches to the axle, a spring-yoke located in the vertical plane of the spring-post and receiving the extended arms of the same, a spring surrounding said arms whereby the axle is permitted to move freely in the vertical plane about a stud carried by the spring-yoke, said stud being in the same vertical plane as the spring-post, as described.

3. In a suspension device for the forward end of a three-point suspension truck, a forward axle, a front frame-piece slidably secured thereto, a spring-post secured to the axle and having oppositely extending arms with a shoulder portion between the arms and the body portion of the post, a spring-yoke receiving the oppositely extended arms, a stud carried thereby for receiving a bored-out hub portion on the front frame-piece whereby free vertical movement of the forward end of the motor-frame is permitted, and whereby the forward axle and motor frame can oscillate freely about said stud, as described.

4. In a motor frame construction, a rear axle, a forward axle, reaches connecting the same, a motor supported on the reaches and near the rear axle, the forward end of the reaches being connected to a front frame end plate, said plate being pivotally connected to a stud supported by the forward axle, a spring post carried by the axle, a yoke member connected to the spring post, springs between the axle and the ends of the yoke member, the stud being secured to the yoke member, whereby the reaches and front axle can move independently of each other, as described.

5. In a motor frame construction, a rear axle, a forward axle, reaches connecting the same, a motor supported on the reaches and near the rear axle, the forward end of the reaches being connected to a front frame end plate, said plate being pivotally connected to a stud supported by the forward axle, a spring-post carried by the axle, a yoke-member connected to the spring-post, springs between the axle and the ends of the yoke member, the stud being secured to the yoke member, whereby the reaches and front axle can move independently of each other.

HARRY A. KNOX.

Witnesses:
K. I. CLEMONS,
H. W. BOWEN.